United States Patent [19]
Irgens-Bergh

[11] 3,877,914
[45] Apr. 15, 1975

[54] METHOD AND APPARATUS FOR MAKING GLASS SPHERES

[75] Inventor: Ib Von Irgens-Bergh, Copenhagen, Denmark

[73] Assignee: Potters Industries, Inc., Carlstadt, N.J.

[22] Filed: June 18, 1973

[21] Appl. No.: 370,649

[52] U.S. Cl............... 65/21; 65/25 R; 65/142; 264/15; 425/10
[51] Int. Cl........................................... C03b 19/10
[58] Field of Search .........65/25 R, 21, 142; 264/15; 425/10

[56] References Cited
UNITED STATES PATENTS

| 980,606 | 1/1911 | Colloseus | 65/21 |
|---|---|---|---|
| 1,638,593 | 8/1927 | Mulholland | 65/25 R |
| 1,739,519 | 12/1929 | Peiler | 65/25 R |
| 3,310,391 | 3/1967 | Law | 65/142 X |
| 3,489,543 | 1/1970 | Kita et al. | 65/25 R |
| 3,594,142 | 7/1971 | Margesson et al. | 65/21 X |

*Primary Examiner*—Robert L. Lindsay, Jr.
*Attorney, Agent, or Firm*—Curtis, Morris & Safford

[57] ABSTRACT

A method and apparatus for making glass spheres in which a series of free falling streams of molten glass is struck in rapid succession by a plurality of rotary porous blades to disperse the streams into a multiplicity of cylindrical particles and direct the particles into a space for a period of time sufficient to enable surface tension to shape the particles into spherical form. Steam or other comparatively moist heating fluid is applied directly to the individual blades to prevent the agglomeration of glass on the face portions of the blades. In some embodiments the steam passes directly through the blades to provide a cushion of steam on the face portions, and the rearward portions of the blades are glazed to seal the pores and thus ensure that all of the steam emerges from the faces.

21 Claims, 6 Drawing Figures

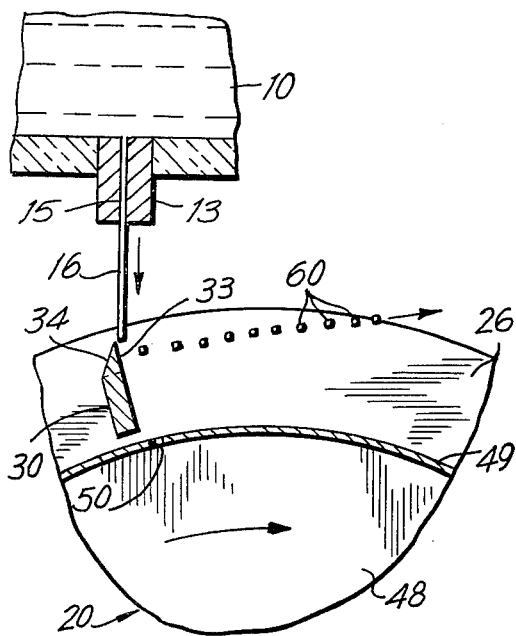
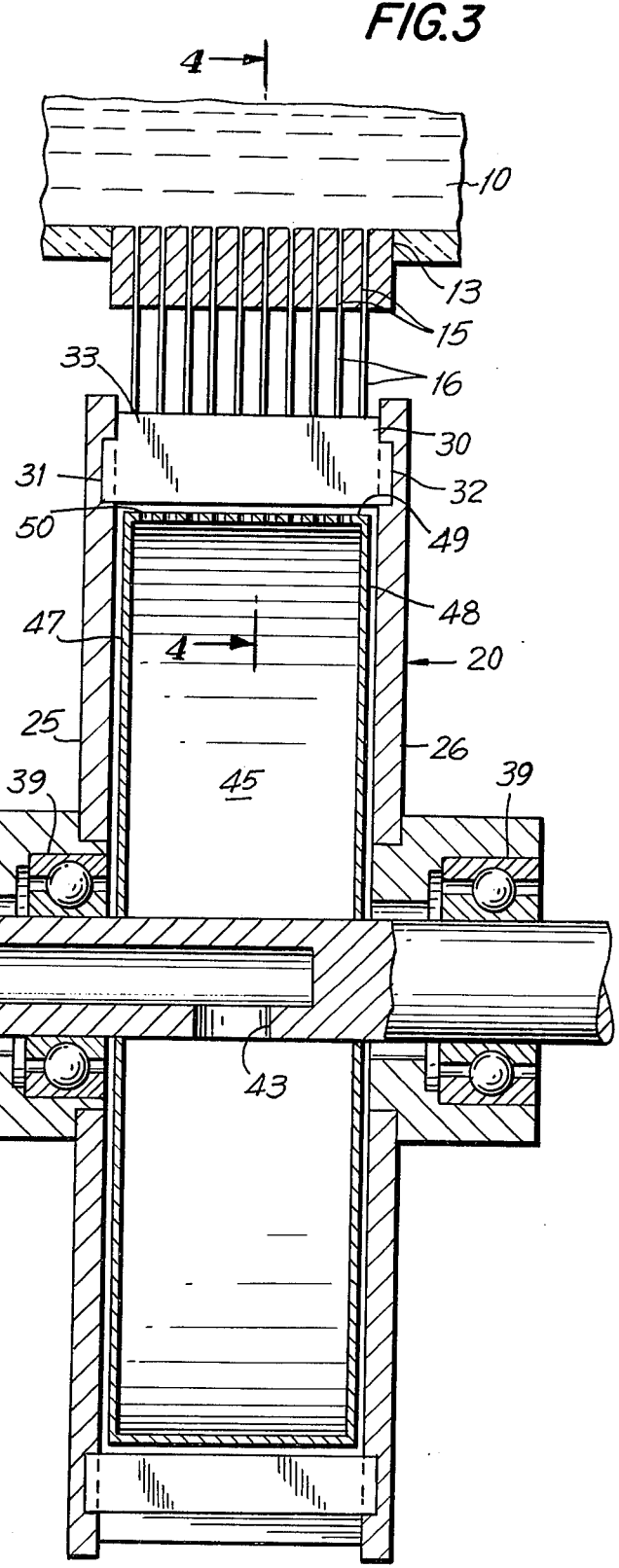
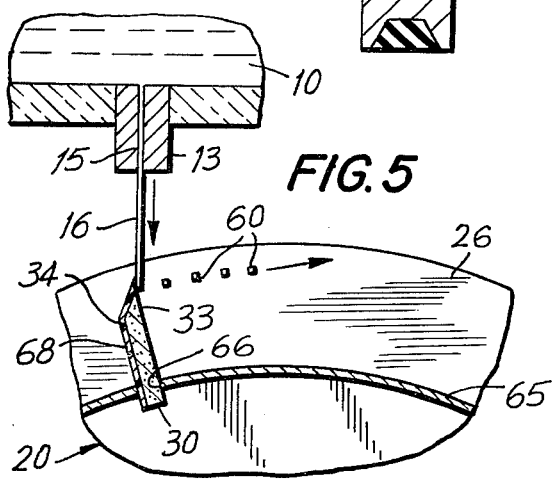

METHOD AND APPARATUS FOR MAKING GLASS SPHERES

BACKGROUND OF THE INVENTION

This invention relates to the manufacture of small-diameter spheres and more particularly to a method and apparatus for making such spheres from a series of molten streams.

There has been developed a system for the manufacture of small-diameter spheres which is straightforward in operation and highly efficient. Representative methods and apparatus in accordance with this system are disclosed, for example, in Lange U.S. Pat. No. 3,495,961 granted Feb. 17, 1970. Such systems commonly employ a rotary chopper wheel which disperses a molten stream into tiny particles and projects them through a heated zone into space for a period of time sufficient to enable surface tension to shape the particles into spherical form. As is well known, the spheres are produced from glass, plastic or other sphere-forming material and have many industrial and commercial applications. For example, they are frequently employed to provide a reflecting surface for highway signs and lane markings, motion picture screens, advertising signs, etc., or as fillers for various thermoplastic and thermosetting resins.

Although systems of the foregoing type have proved effective for many applications, they have exhibited certain disadvantages. For example, the glass or other material from the molten stream occasionally exhibited a tendency to solidify on the blades of the chopper wheel, with the result that the cutting action of the blades deteriorated after repeated usage. In addition, and this has been of special moment in cases in which the molten stream was of large diameter, each blade produced a large but comparatively thin disc of molten glass, and as the disc proceeded along the path of the dispersed particles it was often subjected to uneven cooling, thus producing uneven and sometimes cloudy spheres. Furthermore, the methods and apparatus employed heretofore for the most part did not achieve optimum efficiency while holding operating costs within reasonable limits.

SUMMARY

One general object of this invention, therefore, is to provide a novel and economical method and apparatus for making glass spheres or other spherical particles.

More specifically it is an object of this invention to provide such a method and apparatus in which the tendency of the molten material to solidify on the rotating chopper wheel is substantially reduced.

Another object of this invention is to provide a method and apparatus of the character indicated in which the dispersed particles are of more uniform size and are subjected to uniform cooling throughout their path of travel.

Still another object of the invention is to provide a new and improved apparatus for making glass spheres which is economical and thoroughly reliable in operation.

In one illustrative embodiment of the invention, molten glass or other sphere-forming material is discharged in a series of free falling streams in closely parallel relationship with each other. A continuously rotating chopper wheel is disposed beneath the streams and is provided with a series of blades which successively contact the streams to break them up into a multiplicity of cylindrical particles. The blades direct the cylindrical particles into a space for a period of time sufficient to enable surface tension to shape the particles into spherical form and to cause the setting thereof to form spheres of the desired size.

In accordance with one feature of the invention, steam or other moist fluid is applied directly to the individual blades of the chopper wheel as they contact the molten streams. The arrangement is such that a fluid cushion is formed on the face of each blade to substantially reduce the tendency of the molten material to solidify and agglomerate on the blade.

In accordance with another feature of the invention, in certain particularly important embodiments, the diameter of each of the free falling streams is in substantial correspondence with the diameter of the spheres to be produced. Each stream is chopped such that a molten cylinder is formed of a length substantially equal to its diameter. Because of the shape of the cylinder, extremely uniform and gradual cooling takes place as the cylinder proceeds along its path, and the effects of surface tension convert the cylinder into a substantially perfect sphere.

In accordance with another feature of the invention, in several preferred arrangements, the blades of the chopper are made of carbon or other porous material. The porosity of the blades enhances the wetting action of the steam and further reduces the tendency of the molten material to agglomerate.

In accordance with still another feature of the invention, in some embodiments, the steam is passed directly into each blade, and the pores on the rearward portions of the blades are sealed by a vitreous coating. The steam is discharged through the face portions of the blades to substantially eliminate any agglomeration of the molten material on the face portions.

The present invention, as well as further objects and features thereof, will be more fully understood from the following description of certain preferred embodiments, when read with reference to the accompanying drawings.

BRIEF DESCRIPTION OF THE DRAWINGS

FIG. 3 is an enlarged transverse vertical sectional view taken generally along line 3—3 in FIG. 2.

FIG. 4 is an enlarged fragmentary sectional view taken along the line 4—4 in FIG. 3.

FIG. 5 is a fragmentary sectional view similar to FIG. 4 but showing apparatus for making small-diameter glass spheres in accordance with another illustrative embodiment of the invention.

DESCRIPTION OF CERTAIN PREFERRED EMBODIMENTS

Figure 1:
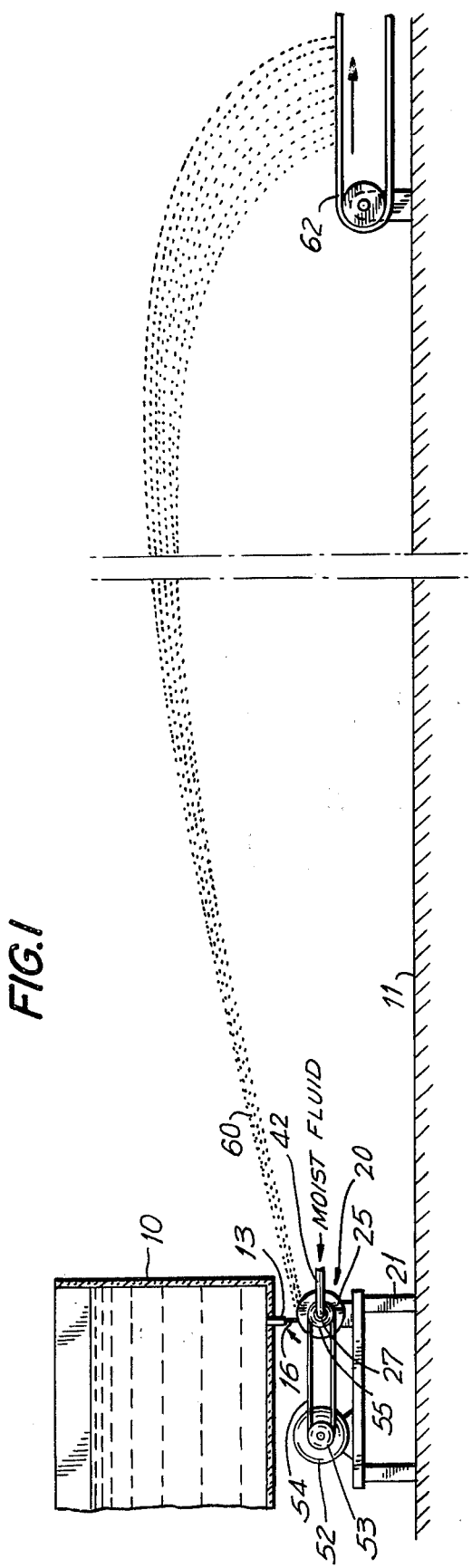
FIG. 1 is a diagrammatic vertical sectional view of apparatus for making small-diameter glass spheres in accordance with one illustrative embodiment of the invention.

Referring to FIG. 1 of the drawings, there is shown a ceramic glass furnace 10 which is suitably supported above the floor 11. The furnace 10 contains a supply of molten glass or other sphere-forming material and is at an elevated temperature to maintain the material in a fluid condition under controlled viscosity.

Positioned adjacent the lowermost portion of the furnace 10 at the right hand end thereof, as viewed in FIG. 1, is a ceramic drain-out block 13. As best shown in FIG. 3, the block 13 includes a plurality of cylindrical orifices 15 which are arrayed in a vertical plane. These orifices communicate with the interior of the glass furnace 10 to produce a series of free falling streams 16 of molten glass. The diameter of the orifices is uniform and is carefully controlled such that the diameter of each of the molten streams is at least approximately equal to the diameter of the spheres to be produced. Thus, to form spheres having a diameter of three millimeters, for example, each of the streams 16 likewise is 3 millimeters in diameter, for purposes that will become more fully apparent hereinafter.

A continuously rotating chopper wheel 20 is located immediately beneath the orifices 15 in the drain-out block 13. The wheel 20 is positioned on a suitable table 21 with its rotational axis extending parallel to the plane of the molten streams 16 but spaced laterally therefrom such that the molten streams strike the wheel at a rising portion thereof. The wheel may be laterally adjustable in a manner more fully described in Lange U.S. Pat. No. 3,495,961 referred to above to allow for variations in the points of impingement.

As best shown in FIg. 3, the chopper wheel 20 includes a pair of spaced discs 25 and 26. The discs 25 and 26 are affixed to a rotatable sleeve 27 such that the discs and the sleeve turn as a unit about a common axis. Interposed at spaced intervals between the discs 25 and 26 is a plurality of chopper blades 30. Each of the blades 30 is disposed in a radial plane, and although the blades are in close proximity with the peripheries of the discs 25 and 26 they are located wholly within the confines of the discs such that the outermost tips of the blades are disposed inwardly of the disc perimeters. Each blade includes side tabs 31 and 32, a flat cutting or face portion 33 and a beveled rearward portion 34 (FIG. 4). The tabs 31 and 32 fit within corresponding recesses in the respective discs to removably hold the blades in place.

The chopper blades 30 are of comparatively rigid porous material. Particularly good results may be achieved in cases in which the blades are made from carbon, although other satisfactory materials include silica glass, quartz, etc. which have been sintered to provide the desired rigidity and heat resistance. In this connection it is important that the sintering temperature be sufficiently low to avoid substantial fusion of the blade material and thus adversely affect its porosity.

The sleeve 27 is rotatably carried on a shaft 38 by suitable bearings 39. The shaft 38 includes an axial bore 40 which communicates at one end with a fluid conduit 42 (FIG. 1) and at the other end with a radial opening 43. The opening 43 interconnects the bore 40 and a cylindrical fluid chamber 45 disposed between the discs 25 and 26. This chamber is defiined by two circular plates 47 and 48 and a cylindrical end wall 49. The plates 47 and 48 are suitably affixed to the shaft 38 and to the end wall 49 such that the shaft, the plates and the end wall form a stationary structure around which the discs, the sleeve and the chopper blades rotate. The end wall 49 is provided with a series of spaced rows of perforations 50 which, as best shown in FIG. 4, are respectively disposed immediately adjacent the face portions 33 of the blades.

The conduit 42 is supplied with pressurized moist fluid which advantageously is at an elevated temperature. For best results, the temperature of the fluid is maintained in excess of about 200°F. The fluid flows along the bore 40 and through the opening 43 into the chamber 45, from which it emerges through the rows of perforations 50 onto the face portions 33 of the blades 30. Because of the porosity of the blade material and the wetting action of the fluid, a fluid cushion is produced over the entire face portion of each blade. Although a wide variety of fluids are satisfactory for this purpose, steam is particularly advantageous. In general substantially any moist fluid may be employed which produces the desired wetting action on the face portions and has the capability of forming fluid cushions thereon under elevated temperatures.

The chopper wheel 20 is continuously rotated at a constant speed in a clockwise direction, as viewed in FIG. 1, by a synchronous motor 52. The shaft of the motor 52 is provided with a drive pulley 53 which is connected through a belt 54 to a second pulley 55 on the sleeve 27. The speed of the sleeve 27, and hence that of the wheel 20, is determined by a number of factors. These include the rate of flow of the molten material from the orifices 15, which in turn is affected by the viscosity of the material, and the number of blades 30 on the wheel. To produce spheres from conventional soda-lime-silica glass with the material at a temperature of about 2300°F. at the point at which it contacts the blades, the speed of the wheel 20 illustratively is of the order of 500 revolutions per minute for an eight-bladed wheel of the type shown in FIGS. 1–4. More generally, for the more common vitreous materials used to produce small spheres the speed of the wheel should be maintained within the range of from about 150 revolutions per minute to about 4,500 revolutions per minute. In cases in which the wheel speed drops much below 150 revolutions per minute, the forces applied by the blades to the individual molten streams 16 are too low to project the dispersed particles a sufficient distance in space, while at speeds in excess of about 4,500 revolutions per minute a deleterious fan effect takes place which can result in the formation of spheres which are not entirely round. In several advantageous embodiments the speed of the wheel should lie within the range of from about 300 revolutions per minute to about 3,000 revolutions per minute for best results.

The glass or other sphere forming material within the furnace 10 is heated to a temperature sufficient to produce molten streams of relatively low viscosity, when compared with the viscosity of glass in conventional glass manufacturing techniques. In certain preferred embodiments, the temperature of the molten glass advantageously is within the range of from about 1900°F. to about 2500°F. at the points at which the streams 16 contact the chopper wheel blades 30. The viscosity of the heated glass for many applications should lie within a range of from about 200 poises down to about 1 poise or even lower. If the viscosity exceeds about 200 poises, the glass exhibits a tendency to string out and form fibers rather than spheres.

Figure 2:
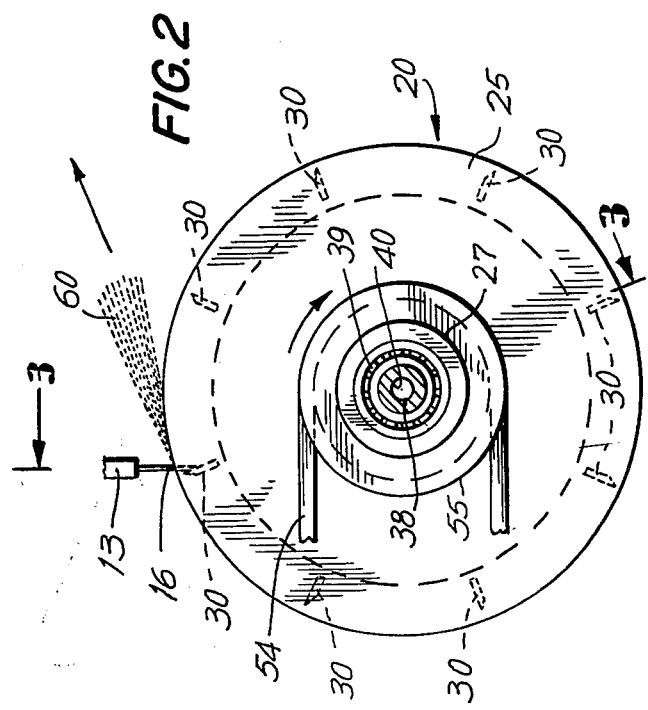
FIG. 2 is an enlarged fragmentary view of a portion of the apparatus shown in FIG. 1.
Figure 2A:
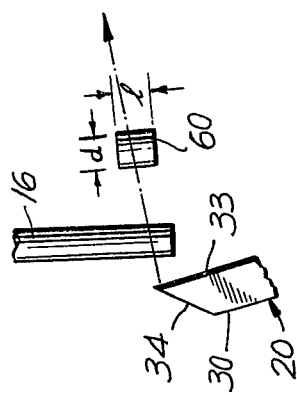
FIG. 2A is a greatly enlarged fragmentary representation of the formation of a molten glass particle through the use of the apparatus.

The molten glass from the furnace 10 is discharged onto the periphery of the rotating chopper wheel 20 in the form of the free falling streams 16. The molten streams are successively contacted by the blades 30 to break up each stream into a multiplicity of discrete particles. As best shown in FIG. 2A, the face portion 33 of each of the blades 30 contacts the lower end of the corresponding stream 16 to produce a particle 60 which initially is of cylindrical configuration. As indicated heretofore, the stream is of a controlled diameter, represented by the diameter $d$ in FIG. 2A, which at least approximately corresponds to the diameter of the spheres to be produced. The length $l$ of the particle 60 similarly is in approximate correspondence with the sphere diameter. The particle is thus in the form of a molten cylinder having a length substantially equal to its diameter.

The rotating blades 30 direct the individual molten particles into a space for a period of time sufficient to enable surface tension to convert the cylindrical shape of the particles into spherical form and to cause the setting thereof to form glass spheres. Systems of the type employed heretofore operated at a comparatively high chopping rate, and the dispersed particles were in the form of thin discs which were subjected to uneven cooling as they moved through space. By insuring that the length of each particle is at least approximately equal to its diameter, the resulting spheres exhibit extremely good clarity and roundness characteristics.

Because of the moist fluid cushion on the face portions 33 of the blades 30, there is little or no tendency of the molten material to solidify and agglomerate on the blades. The spheres proceed through the atmosphere and are collected by a belt conveyor 62 at the end of their trajectory. The conveyor 62 transports the spheres to suitable grading and packaging equipment (not shown).

In certain advantageous embodiments, the steam or other moist fluid for the individual chopper blades 30 is passed directly through each blade onto the face portion 33. In the embodiment illustrated in FIG. 5, for example, the circular plates 47 and 48 (FIG. 3) are eliminated, and a cylindrical rim member 65 is affixed between the chopper discs 25 and 26. The member 65 includes a series of slots 66 which extend in an axial direction and correspond in number to the number of blades 30 on the wheel. The inner ends of the blades 30 are located within these openings and communicate with the chamber formed by the member 65 and the discs 25 and 26.

Each of the blades 30 in the FIG. 5 embodiment is provided with a glazed coating 68 on the rearward portion 34 of the blade. The coating 68 illustratively comprises a granular glass frit in a conventional sealing binder and serves to close the pores on the rearward portion. The chamber between the discs 25 and 26 is supplied with steam under pressure in the manner described heretofore. The steam enters the inner ends of the blades 30, passes through the open cells of the blade material and is discharged through the face portions 33. The emerging steam produces a moist fluid cushion on each of the face portions to prevent the agglomeration of molten glass from the streams 16.

Although the invention has been illustrated and described with particular reference to the manufacture of glass spheres from a series of free falling streams, in many respects it is also applicable to the production of spheres from a single stream of other sphere-forming materials. Various additional uses for the invention will suggest themselves to those skilled in the art upon a perusal of the foregoing disclosure.

The terms and expressions which have been employed are used as terms of description and not of limitation, and there is no intention, in the use of such terms and expressions, of excluding any equivalents of the features shown and described, or portions thereof, it being recognized that various modifications are possible within the spirit and scope of the invention.

What is claimed is:

1. A method for making small diameter spheres which comprises:

providing at least one free falling stream of molten sphere-forming material;

successively contacting the molten stream with the blades of a continuously rotating chopper wheel, the wheel being rotated at a speed within the range of from about 150 revolutions per minute to about 4,500 revolutions per minute, to break up the stream into a multiplicity of discrete particles;

applying a moist fluid directly through the individual blades of the chopper wheel to provide a fluid cushion between the portion of each blade which contacts the molten stream and the molten stream;

the blades directing the multiplicity of discrete particles into a space for a period of time sufficient to enable surface tension to shape the particles into spherical form and to cause the setting thereof to form spheres; and collecting the thus formed spheres.

2. A method for making small diameter spheres which comprises:

providing at least one free falling stream of molten sphere-forming material;

successively contacting the molten stream with the blades of a continuously rotating chopper wheel to break up the stream into a multiplicity of discrete particles, each of the blades being of porous material and having a rearward portion and a forward portion in position to contact the stream;

directing a moist fluid through the pores of the blades and out their forward portions to provide a fluid cushion over the forward portion of each blade as it contacts the molten stream;

the blades directing the multiplicity of discrete particles into a space for a period of time sufficient to enable surface tension to shape the particles into spherical form and to cause the setting thereof to form spheres; and collecting the thus formed spheres.

3. A method for making small diameter spheres which comprises:

providing a series of free falling streams of molten sphere-forming material in substantially parallel relationship with each other;

successively contacting the molten streams with the blades of a continuously rotating chopper wheel, each of the blades making simultaneous contact with all of the streams to break up the streams into a multiplicity of cylindrical particles which each has a length substantially equal to its diameter;

apply steam directly through the individual blades of the chopper wheel to provide a flow of steam over at least a portion of each blade as it contacts the molten streams to provide a fluid cushion between the blades and the molten material;

the blades directing the multiplicity of particles into a space for a period of time sufficient to enable surface tension to shape the particles into spherical form and to cause the setting thereof to form spheres; and collecting the thus formed spheres.

4. A method for making glass spheres which comprises:

providing a series of free falling streams of molten glass in substantially parallel relationship with each other;

successively contacting the molten streams with the blades of a continuously rotating chopper wheel, each of the blades making simultaneous contact with all of the streams with the streams at a temperature of from about 1900°F. to about 2500°F. at the points of contact, to break up the streams into a multiplicity of discrete particles;

applying a heating fluid directly through the individual blades of the chopper wheel to provide a flow of fluid over at least a portion of each blade as it contacts the molten streams;

the blades directing the multiplicity of discrete particles into a space for a period of time sufficient to enable surface tension to shape the particles into spherical form and to cause the setting thereof to form glass spheres; and collecting the thus formed spheres.

5. A method as defined in claim 4, in which the temperature of the applied fluid is at least about 200°F.

6. A method for making glass spheres which comprises:

providing a series of free falling streams of molten glass in substantially parallel relationship with each other;

successively contacting the molten streams with the blades of a continuously rotating chopper wheel, each of the blades have a face portion which makes simultaneous contact with all of the streams, to break up the streams into a multiplicity of discrete particles;

applying a moist fluid directly through the face portions of the chopper wheel blades to provide a fluid cushion over the face portion of each blade as it contacts the molten streams;

the blades directing the multiplicity of discrete particles into a space for a period of time sufficient to enable surface tension to shape the particles into spherical form and to cause the setting thereof to form glass spheres; and collecting the thus formed spheres.

7. A method as defined in claim 6, in which the fluid is steam.

8. A method for making glass spheres which comprises:

providing a series of free falling streams of molten glass in substantially parallel relationship with each other;

successively contacting the molten streams with the blades of a continuously rotating chopper wheel, each of the blades being of porous material and having a face portion which makes simultaneous contact with all of the streams, to break up the streams into a multiplicity of discrete particles;

directing steam through the pores of the blades and out their face portions to provide a fluid cushion over the portion of each blade as it contacts the molten streams; the blades directing the multiplicity of discrete particles into a space for a period of time sufficient to enable surface tension to shape the particles into spherical form and to cause the setting thereof to form glass spheres; and collecting the thus formed spheres.

9. A method as defined in claim 8, in which the molten streams are maintained at a temperature of from about 1900°F. to about 2500°F. at the points at which they are contacted by the chopper wheel blades.

10. Apparatus for making small diameter spheres which comprises:

means for supplying molten sphere-forming material;

means defining an orifice communicating with said means for providing molten glass for providing a free falling molten stream;

a chopper wheel rotatably disposed beneath the orifice defining means, the chopper wheel including a plurality of blades of porous material in position to successively contact the molten stream;

means for applying a moist fluid directly through the individual blades of the chopper wheel to provide a fluid cushion over the portion of each blade which contacts the molten stream;

means for continuously rotating the chopper wheel at a speed within the range of from about 150 revolutions per minute to about 4,500 revolutions per minute, to bring the blades into successive contact with the molten stream and thereby break up the stream into a multiplicity of glass particles, the blades directing the particles into a space for a period of time sufficient to enable surface tension to shape the particles into spherical form and to cause the setting thereof to form spheres; and means for collecting the spheres in solid form at the end of their trajectory.

11. Apparatus as defined in claim 10, in which the blades are of carbon.

12. Apparatus for making small diameter spheres which comprises:

means for supplying molten sphere-forming material;

means defining an orifice communicating with said means for providing molten glass for providing a free falling molten stream;

a chopper wheel rotatably disposed beneath the orifice defining means, the chopper wheel including a plurality of blades of porous material, each of the blades having a rearward portion and a face portion in position to contact the molten stream;

means for directing a moist fluid through the pores of the individual blades and out their face portions to provide a fluid cushion over the face portion of each blade;

means for continuously rotating the chopper wheel to bring the blades into successive contact with the molten stream and thereby break up the stream into a multiplicity of glass particles, the blades directing the particles into a space for a period of time sufficient to enable surface tension to shape the particles into spherical form and to cause the setting thereof to form spheres; and means for collecting the spheres in solid form at the end of their trajectory.

13. Apparatus for making glass spheres which comprises:

means for supplying molten glass;

means defining an orifice communicating with said means for providing molten glass for providing a free falling molten glass stream;

a chopper wheel rotatably disposed beneath the orifice defining means, the chopper wheel including a plurality of blades of porous material disposed about its periphery, each of the blades having a rearward portion and a face portion in position to contact the molten stream;

means for applying a moist fluid directly to the individual blades of the chopper wheel to provide a fluid cushion over the face portion of each blade;

means forming a vitreous coating on the rearward portions of the chopper wheel blades for sealing the same;

means for continuously rotating the chopper wheel to bring the blades into successive contact with the molten stream and thereby break up the stream into a multiplicity of glass particles, theh blades directing the particles into a space for a period of time sufficient to enable surface tension to shape the particles into spherical form and to cause the setting thereof to form glass spheres; and means for collecting the spheres in solid form at the end of their trajectory.

14. Apparatus as defined in claim 13, in which the fluid applying means comprises a cylindrical steam chamber rotatable with the chopper wheel, the chamber having a plurality of slots spaced about its periphery, one of the blades of said chopper wheel being disposed in each of said slots.

15. Apparatus for making glass spheres which comprises:

means for supplying molten glass;

means defining a plurality of orifices communicating with said means for providing molten glass and in spaced parallel relationship with each other for providing a series of free falling molten glass streams;

a chopper wheel rotatably disposed beneath the orifice defining means, the chopper wheel including a plurality of blades of porous material disposed about its periphery in position to successively contact the molten streams, each of the blades having a rearward portion and a face portion for making simultaneous contact with all of the streams;

means for applying a heating fluid directly through the individual blades of the chopper wheel to provide a flow of fluid over the face portion of each blade;

means for continuously rotating the chopper wheel to bring the heated blades into successive contact with the molten streams and thereby break up the streams into a multiplicity of glass particles, the blades directing the particles into a space for a period of time sufficient to enable surface tension to shape the particles into spherical form and to cause the setting thereof to form glass spheres; and means for collecting the spheres in solid form at the end of their trajectory.

16. Apparatus as defined in claim 15, in which the fluid applying means comprises a cylindrical chamber coaxial with the chopper wheel, the chamber having a plurality of openings spaced about its periphery.

17. Apparatus as defined in claim 16, in which a part of each blade is located within one of said openings and is exposed to the interior of said chamber.

18. Apparatus as defined in claim 16, in which the blades are angularly spaced from said openings.

19. Apparatus for making glass spheres which comprises:

means for supplying molten glass;

means defining a plurality of orifices communicating with said means for providing molten glass and in spaced parallel relationship with each other for providing a series of free falling molten glass streams;

a chopper wheel rotatably disposed beneath the orifice defining means, the chopper wheel including a, plurality of blades of porous material disposed about its periphery in position to successively contact the molten streams, each of the blades having a rearward portion and a face portion for making simultaneous contact with all of the streams;

means for directing steam through the pores of the individual blades and out their face portions to provide a steam cushion over the face portion of each blade;

means forming a vitreous coating on the rearward portions of the chopper wheel blades for sealing the same;

means for continuously rotating the chopper wheel to bring the blades into successive contact with the molten streams and thereby break up the streams into a multiplicity of glass particles, the blades directing the particles into a space for a period of time sufficient to enable surface tension to shape the particles into spherical form and to cause the setting thereof to form glass spheres; and means for collecting the spheres in solid form at the end of their trajectory.

20. Apparatus for making glass spheres which comprises:

means for supplying molten glass;

means defining a plurality of orifices communicating with said means for providing molten glass and in spaced parallel relationship with each other for providing a series of free falling molten glass streams;

a chopper wheel rotatably disposed beneath the orifice defining means, the chopper wheel including a pair of spaced coaxial discs and a plurality of porous carbon blades affixed to the discs in position to successively contact the molten streams, each of the blades having a rearward portion and a face portion for making simultaneous contact with all of the streams;

means for directing steam through the pores of the individual blades and out their face portions to provide a fluid cushion over the face portion of each blade, said last-mentioned means including a cylindrical member interposed between said discs and forming a substantially enclosed steam chamber therewith;

means forming a vitreous coating on the rearward portions of the chopper wheel blades for sealing the same;

means for continuously rotating the chopper wheel to bring the blades into successive contact with the molten streams and thereby break up the streams into a multiplicity of glass particles, the blades directing the particles into a space for a period of time sufficient to enable surface tension to shape the particles into spherical form and to cause the setting thereof to form glass spheres; and means for collecting the spheres in solid form at the end of their trajectory.

21. Apparatus as defined in claim 20, in which:

each of the orifices is of cylindrical configuration to provide cylindrical molten streams of a diameter commensurate with that of the spheres; and the blades of the chopper wheel contact the streams to produce cylindrical particles which each has a length substantially equal to its diameter.

* * * * *